United States Patent [19]
Karlstrom

[11] 3,774,545
[45] Nov. 27, 1973

[54] CONVEYOR CHAIN STRUCTURE
[75] Inventor: Karl R. M. Karlstrom, Warren, Mich.
[73] Assignee: American Chain & Cable Company Inc., New York, N.Y.
[22] Filed: Nov. 8, 1971
[21] Appl. No.: 196,386

[52] U.S. Cl............ 104/172 C, 198/189, 74/251 C
[51] Int. Cl............................................. B65g 17/38
[58] Field of Search.................. 104/172 C, 172 BT, 104/172 S; 198/189; 74/248, 249, 250, 251, 254

[56] References Cited
UNITED STATES PATENTS
3,543,689 12/1970 Dehne............................ 104/172 C
3,438,338 4/1969 Bildsoe et al. ................. 104/172 C
2,952,162 9/1960 Thibault............................... 74/254

FOREIGN PATENTS OR APPLICATIONS
211,802 3/1967 Sweden............................. 198/189

Primary Examiner—Robert G. Sheridan
Assistant Examiner—Robert Saifer
Attorney—Arthur Raisch et al.

[57] ABSTRACT

A conveyor structure including a power track in which a conveyor chain travels and a free track along which free trolleys travel. The conveyor chain includes alternate main links that the pivotally interconnected by alternate pairs of upper and lower links through pivot pins. The construction of the links and pivot pins is such that there is permissible movement between the main links and the pivot pins about horizontal axes and permissible movement between the pairs of links and pivot pins about vertical axes. In one form, the conveyor comprises a tow line conveyor structure including a floor having a track slot therein through which the tow pin of carriers or tow carts is adapted to extend and a chain supporting structure beneath the slot. In another form, the conveyor comprises an overhead power and free conveyor comprising a load supporting free track on which the carriers are movable and a power track in which the conveyor is moved.

13 Claims, 13 Drawing Figures

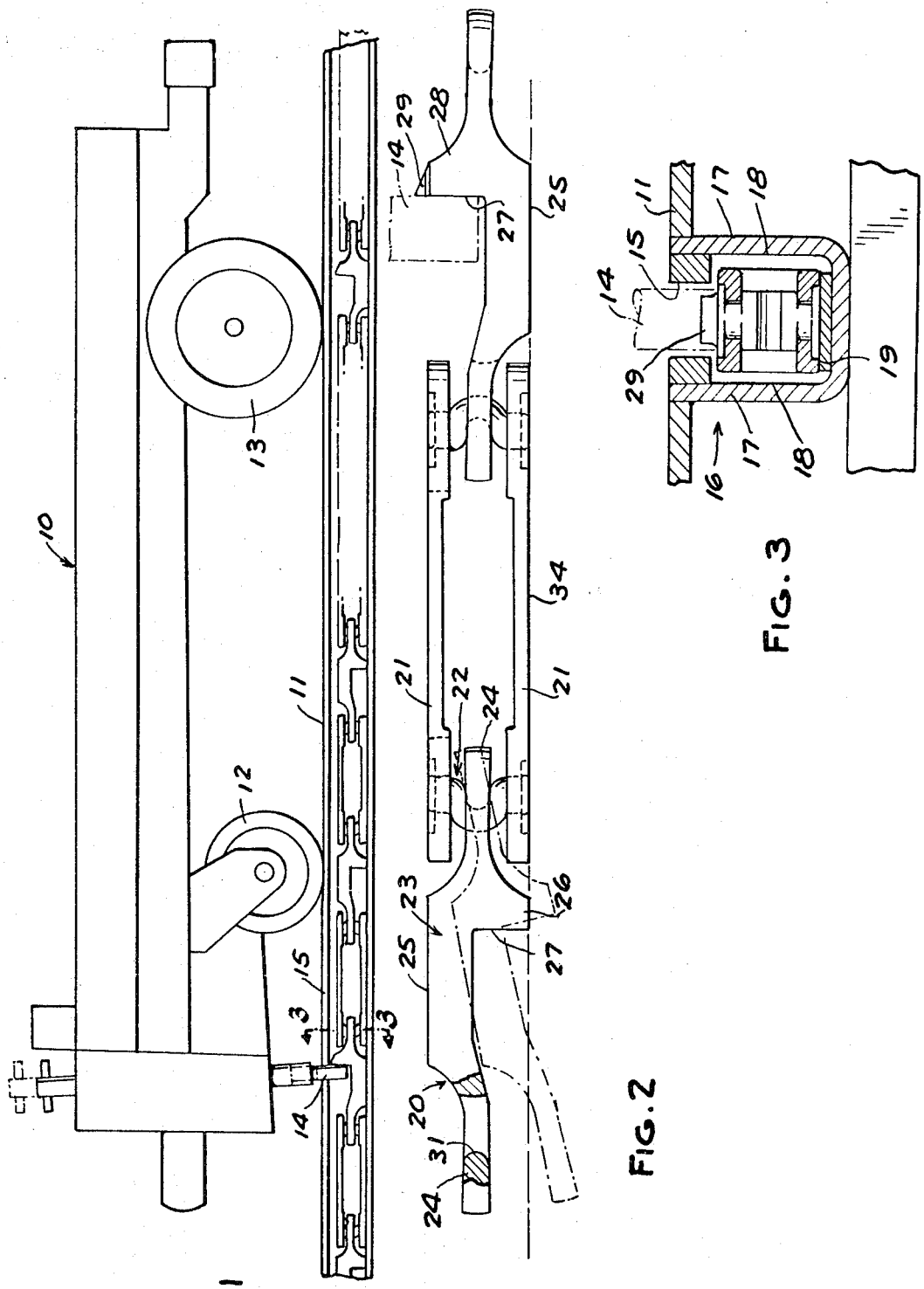

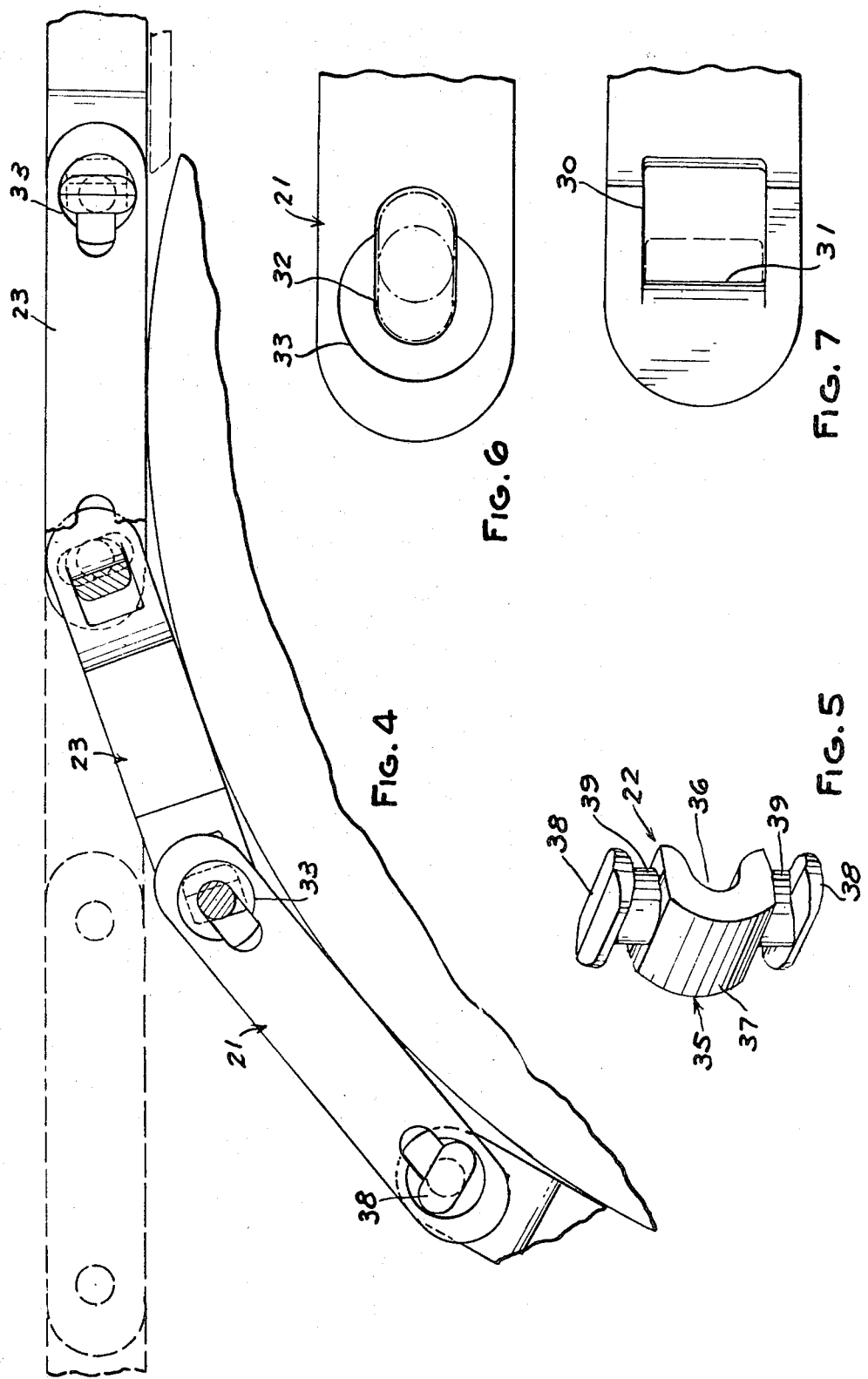

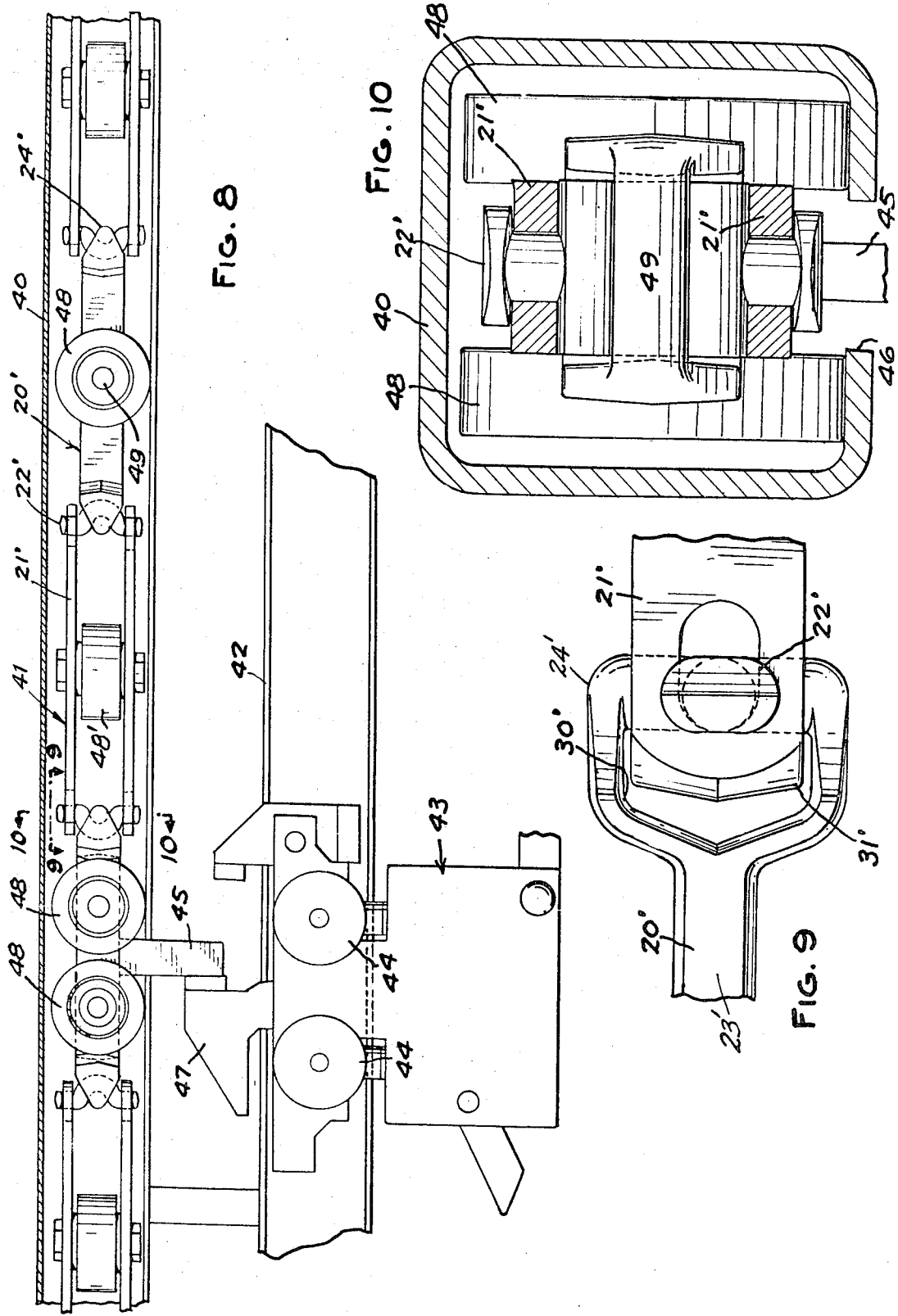

CONVEYOR CHAIN STRUCTURE

This invention relates to conveyors and particularly to conveyor structures.

BACKGROUND OF THE INVENTION

In conveyor systems such as overhead power and free conveyor systems and tow line conveyor systems, conveyor chains are provided for moving the carriers along a track which in the case of an overhead conveyor is a free track and in the case of a tow line conveyor is the floor. In an overhead conveyor system, the wheeled carriers are moved along a free track by the conveyor which operates in a power track and has means thereon for engaging the carriers on the free track.

In tow line conveyor systems, wheeled carriers are moved along a floor by a conveyor positioned beneath the floor which are engaged by tow pins extending through a slot in the floor to engagement with the conveyor. In such conveyor systems, it is desirable to provide a conveyor or chain that will have a minimum vertical height but at the same time will be subject to permissible flexing or pivoting about both horizontal and vertical axes.

Among the objects of the invention are to provide a conveyor system wherein the conveyor occupies minimum vertical height and width; wherein the conveyor chain is permitted to pivot or bend in both horizontal and vertical directions; which can be assembled and disassembled readily at any point; will operate in an enclosed track; which has minimum wear; and which can be produced at relatively low cost.

SUMMARY OF THE INVENTION

A power and free conveyor structure including a free track along which trolleys are moved and a power track in which a conveyor chain operates. A conveyor chain is positioned on the chain supporting structure and includes alternate main links that are pivotally interconnected by alternate pairs of upper and lower links through pivot pins. The construction of the links and pivot pins is such that there is permissible movement between the main links and the pivot pins about horizontal axes and permissible movement between the pairs of links and the pivot pins about vertical axes.

In one form, the conveyor comprises a tow line conveyor structure including a floor having a slot therein through which the tow pin of carriers is adapted to extend and a chain supporting structure beneath the slot. In another form, the conveyor comprises an overhead power and free conveyor comprising a load supporting free track on which the carriers are movable and a power track in which the conveyor is moved.

DESCRIPTION OF THE DRAWINGS

FIG. 1 is a part-sectional side elevational view of a tow line conveyor system embodying the invention.

FIG. 2 is a side elevational view of the chain on an enlarged scale of a portion of the conveyor shown in FIG. 1.

FIG. 3 is a fragmentary sectional view on an enlarged scale taken along the line 3—3 in FIG. 1.

FIG. 4 is a fragmentary part-sectional plan view of a portion of the conveyor shown in FIG. 2.

FIG. 5 is a perspective view of a chain pin.

FIG. 6 is a fragmentary plan view showing the chain parts in a different operative position for assembly and disassembly.

FIG. 7 is a fragmentary plan view of another part of the conveyor chain.

FIG. 8 is a part-sectional fragmentary elevational view of a power and free conveyor system embodying the invention.

FIG. 9 is a fragmentary sectional view of an enlarged scale taken along the line 9—9 in FIG. 8.

FIG. 10 is a fragmentary sectional view on an enlarged scale taken along the line 10—10 in FIG. 8.

DESCRIPTION

Figure 11:
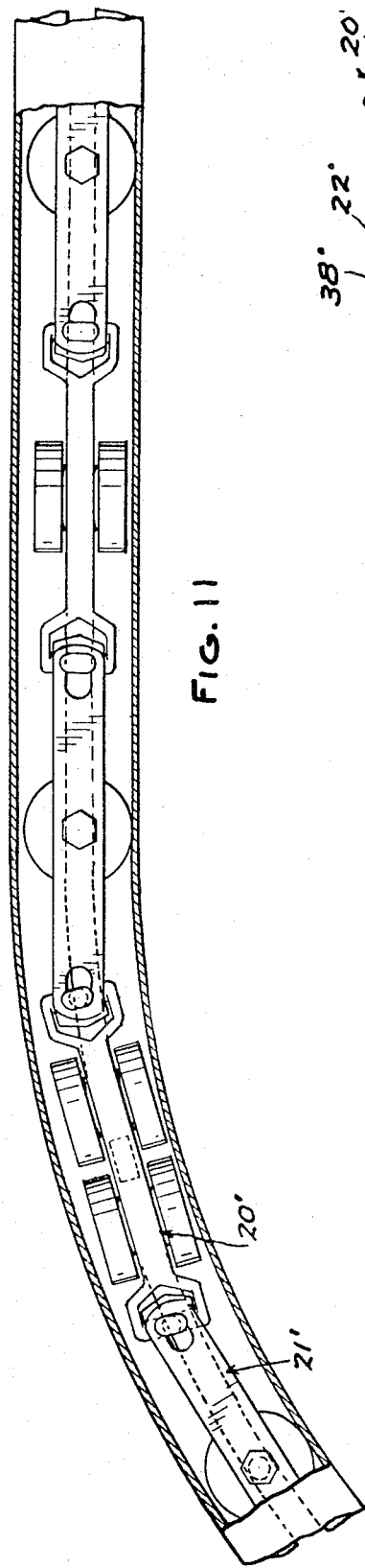
FIG. 11 is a fragmentary part-sectional plan view of a portion of the conveyor shown in FIG. 8.

The invention relates to a conveyor chain such as used in, but not limited to, tow line conveyor systems and power and free conveyor systems. Referring to FIG. 1, the tow line conveyor system embodying the invention comprises a plurality of carriers 10 which are movably supported on a floor 11 by wheels 12, 13. Each carrier 10 includes a tow pin 14 that extends downwardly through a slot 15 in the floor 11 into engagement with a conveyor for moving the carrier in a predetermined path along the floor 11.

As shown in FIG. 3, a chain supporting structure 16 comprising spaced walls 17 is provided beneath the floor to define side wall surfaces 18 and bottom wall surfaces 19 for receiving a conveyor chain.

As shown in FIG. 2, the conveyor chain comprises alternate main links 20 that are pivotally connected to alternate pairs of upper and lower links 21 by pivot pins 22. Each main link 20 comprises a central body 23 and ends 24 that extend axially from the ends of the body 23 intermediate the top and bottom surfaces thereof. The body 23 of each main link 20 includes opposed flat surfaces 25, 26, the surface 26 having a substantially lesser longitudinal extent to define a recess 27. When positioned as shown on the left in FIG. 2, with the surface 26 facing downwardly and engaging bottom wall surfaces 19, the link 20 constitutes a main chain supporting link. When reversed 180° as shown on the right in FIG. 2 with the surface 25 extending downwardly, the recess 27 defines a pushing dog 28 for engaging the tow pin 14. If desired, an additional projection 29 can be welded to the link 20 on surface 26, when it is in the position shown on the right in FIG. 2, to obtain greater vertical surface contact with the tow pin 14.

As shown in FIG. 7, a generally rectangular opening 30 is provided in each end 24 of the link 20. The outermost edge 31 of each opening 20 is convex in vertical cross section and straight in horizontal cross section (FIGS. 1, 7).

As shown in FIGS. 2, 4 and 6, links 21 are identical and have an axially elongated opening 32 therein that has a greater length than width and a generally annular recess 33 in the outer surface thereof for purposes presently described. As shown in FIG. 2, each link has a flat outer surface 34 and flat surface 34 of the lowermost link 21 engages the base surfaces 19 of the chain supporting structure 16.

Referring to FIG. 5, each pivot pin 22 includes a central enlarged body portion 35 that has a transverse horizontal recess 36 therein which is concave in vertical cross section and straight in horizontal cross section and an opposed convex surface 37. Each pivot pin 22 further includes transverse end portions 38 connected to the central portion 35 by intermediate portions 39. Intermediate portions 39 are generally cylindrical and have a diameter substantially equal to the width of opening 32 of links 21. The transverse end portions 38 have a width in a direction transversely of the pin that is substantially equal to the width of the opening 32 of link 21 and a length substantially equal to the diameter of recess 33 and the length of opening 32.

In order to assemble the conveyor chain, a pivot pin 22 is brought into position and placed in the opening 30 of a link 20 with the recess 36 engaging the surface 31. Links 21 are then positioned over the projections 38 with the long dimensions of projections 38 aligned with the long dimensions of openings 32 as shown in FIG. 6. After the links 21 are inserted over the projections 38, the links 21 are rotated 90° causing the transverse projections 38 to assume the relationship as shown in FIG. 4.

When assembled, the conveyor chain provides substantially no movement about a vertical axis and permissible movement about a horizontal axis between the main links 23 and the pivot pin 22 as shown in broken lines in FIG. 2; and the construction provides substantially no permissible movement about a horizontal axis and permissible movement about a vertical axis between the links 21 and the pivot pins 22.

It can be appreciated that the chain can be disassembled at any point along the link thereof for replacement or repair.

Referring now to FIGS. 8-13, the power and free conveyor system embodying the invention comprises a power track 40 in which a conveyor chain 41 made in accordance with the invention is driven. The system further comprises a free track 42 in which trolleys or carriers 43 having wheels 44 thereon are operated. The chain includes a plurality of pushers 45 that extend downwardly through a slot 46 into engagement with a pusher dog 47 on the carrier 43.

As shown in FIG. 8, the conveyor chain comprises alternate main links 20' that are pivotally connected to alternate pairs of upper and lower links 21' by pivot pins 22'. each main link 20' comprises a central body 23' and ends 24' that extend axially from the ends of the body 23' intermediate the top and bottom surfaces thereof. The body 23' of each main link 20' rotatably supports wheels 48 that are mounted on a pin 49. Wheels 48 engage track 40 (FIG. 8). Wheels 48' are also rotatably supported between links 21' and engage the side walls of track 40.

As shown in FIGS. 8 and 9, an opening 30' is provided in each end 24' of the link 20'. The outermost edge 31' of each opening 20' is convex in vertical cross section and straight in horizontal cross section (FIGS. 1, 7).

Figure 13:
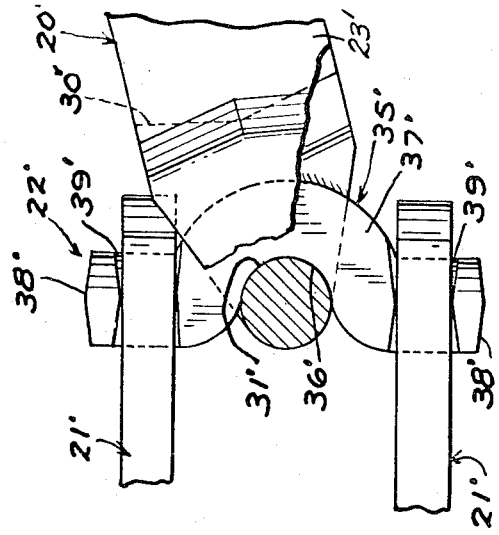
FIG. 13 is a fragmentary elevational view of a portion of the conveyor chain showing the parts in a different operative position.
Figure 12:
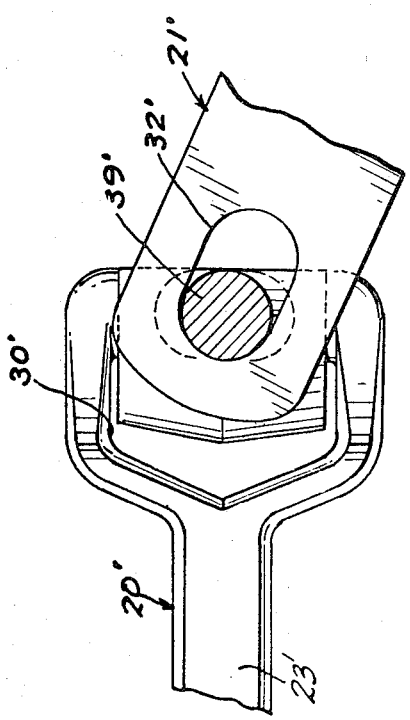
FIG. 12 is a fragmentary plan view on an enlarged scale showing a portion of the conveyor chain structure of the form of the invention shown in FIG. 11.

As shown in FIGS. 11-13, links 21' are identical and have an axially elongated opening 32' therein that has a greater length than width.

Referring to FIG. 13, each pivot pin 22' includes a central enlarged body portion 35' that has a transverse horizontal recess 36' therein which is concave in vertical cross section and straight in horizontal cross section and an opposed convex surface 37'. Each pivot pin 22' further includes transverse end portins 38' connected to the central portion 35' by intermediate portions 39'. Intermediate portions 39' are generally cylindrical and have a diameter substantially equal to the width of opening 32' of links 21'. The transverse end portions 38 have a width in a direction transversely of the pin that is substantially equal to the width of the opening 32' of link 21' and a length substantially equal to the length of opening 32'.

In order to assemble the conveyor chain, a pivot pin 22' is brought into position and placed in the opening 30' of a link 20' with the recess 36' engaging the surface 31'. Links 21' are then positioned over the projections 38' aligned with the long dimensions of openings 32' as shown in FIG. 6. After the links 21' are inserted over the projections 38, the links 21 are rotated 90° causing the transverse projections 38' to assume the relationship as shown in FIG. 9.

When assembled, the conveyor chain provides substantially no movement about a vertical axis and permissible pivotal movement about a horizontal axis between the main links 23' and the pivot pin 22' as shown in FIG. 13; and the construction provides substantially no permissible movement about a horizontal axis and permissible movement about a vertical axis between the links 21' and the pivot pins 22' as shown in FIG. 12.

It can be appreciated that the chain can be disassembled at any point along the link thereof for replacement or repair.

I claim:

1. In a conveyor system, the combination comprising
load supporting means along which carriers are moved in a predetermined path,
supporting means mounted along said load supporting means defining a conveyor chain supporting structure including a side wall and a base wall,
and a conveyor chain in said supporting means comprising a plurality of alternate main links,
alternate pairs of upper and lower links between said main links,
each said main link comprising a central body and ends,
at least some of the main links having interengaging means for selectively engaging a carrier,
each said end having a vertically extending opening therein,
the axially outermost portion of said opening being substantially straight in transverse cross section,
each said opening of said main link being elongated in an axial direction with respect to the main link,
each said pair of said upper and lower links including an opening therein which is elongated in an axial direction,
a pivot pin extending through each said opening of each end of said main link and said openings in one end of said pairs of links,
each said pivot pin having a centrally enlarged body portion, transversely extending end portions having a length in a direction transversely of the pair of links which is greater than the width of the openings in said links, and an intermediate interconnecting portion which has a width less than the transverse dimension of said central enlarged portion and said transverse end portions, said centrally enlarged body portion of each said pivot pin having a surface engaging the outermost edge of the respective opening of the main link, said surface being convex in vertical cross section and substantially straight in horizontal cross section whereby there is substantially no permissible movement between said main link and said pivot pin about a vertical axis but at least permissible pivotal movement about a horizontal axis between the main link and the pivot pin, and there is no permissible movement about a vertical axis between the pairs of links and the pivot pin.

2. The combination set forth in claim 1 wherein said centrally enlarged body portion of each said pivot pin has a transverse surface on the side opposite to that of the first-mentioned surface on said intermediate portion, said surface being convex in vertical cross section.

3. The combination set forth in claim 1 wherein said intermediate portion of each said pivot pin is circular in cross section.

4. The combination set forth in claim 1 wherein said intermediate portion of each said pivot pin is cylindrical.

5. The combination set forth in claim 1 wherein at least one wheel is rotatably supported on the body of at least some of the main links.

6. The combination set forth in claim 1 wherein the outermost edge of the opening in each said main link is generally curved in vertical cross section.

7. The combination set forth in claim 1 wherein each said link of said pair of links includes a generally annular recess in the outer surface thereof.

8. The combination set forth in claim 7 wherein the depth of said recess in each said pair of links is substantially equal to the thickness of a transversely extending end portion of the pivot pin.

9. The combination set forth in claim 1 wherein said load supporting means comprises
a floor having a slot therein through which the tow pin of a carrier is adapted to extend.

10. In a power and free conveyor system, a conveyor chain comprising
a plurality of alternate main links,
at least some of the main links having interengaging means for selectively engaging a carrier,
alternate pairs of links,
each said main link comprising a central body and ends,
each said end having a vertically extending opening therein,
the axially outermost portion of said opening being substantially straight in transverse cross section,
each said opening of said main link being elongated in an axial direction with respect to the main link,
each said pair of said upper and lower links including an opening therein which is elongated in an axial direction,
a pivot pin extending through each said opening of each end of said main link and said openings in one end of said pair of links,
each said pivot pin having a centrally enlarged body portion,
transversely extending end portions having a length in a direction transversely of the pair of links which is greater than the width of the openings in said links, and an intermediate interconnecting portion which has a width less than the transverse dimension of said central enlarged portion and said transverse end portions,
said centrally enlarged body portion of each said pivot pin having a surface engaging the outermost edge of the respective opening of the main link, said surface being convex in vertical cross section and substantially straight in horizontal cross section whereby there is substantially no permissible movement between said main link and said pivot pin about a vertical axis but at least permissible pivotal movement about a horizontal axis between the main link and the pivot pin and there is no permissible movement about a horizontal axis but at least permissible movement about a vertical axis between the pairs of links and the pivot pin.

11. The combination set forth in claim 10 wherein said centrally enlarged body portion of each said pivot pin has a transverse surface on the side opposite to that of the first-mentioned surface on said intermediate portion, said surface being convex in vertical cross section.

12. The combination set forth in claim 11 wherein said intermediate portion of each said pivot pin is circular in cross section.

13. The combination set forth in claim 12 wherein said intermediate portion of each said pivot pin is cylindrical.

* * * * *

UNITED STATES PATENT OFFICE
CERTIFICATE OF CORRECTION

Patent No. 3,774,545          Dated November 27, 1973

Inventor(s) Karl R. M. Karlstrom

It is certified that error appears in the above-identified patent and that said Letters Patent are hereby corrected as shown below:

Column 5, line 11, after 'a', insert --horizontal axis but at least permissible movement about a--

Signed and sealed this 14th day of May 1974.

(SEAL)
Attest:

EDWARD M. FLETCHER, JR.
Attesting Officer

C. MARSHALL DANN
Commissioner of Patents